(12) United States Patent
Toyoda (10) Patent No.: US 7,757,801 B2
(45) Date of Patent: Jul. 20, 2010

(54) REAR SWING ARM INSTALLATION STRUCTURE

(75) Inventor: Hidetoshi Toyoda, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 87 days.

(21) Appl. No.: 11/446,107

(22) Filed: Jun. 5, 2006

(65) Prior Publication Data

US 2006/0278458 A1 Dec. 14, 2006

(30) Foreign Application Priority Data

Jun. 8, 2005 (JP) ............................. 2005-167754

(51) Int. Cl.
*B62D 61/02* (2006.01)
(52) U.S. Cl. .................. 180/227; 180/219; 180/226
(58) Field of Classification Search ................. 180/219, 180/226, 227, 228
See application file for complete search history.

(56) References Cited

U.S. PATENT DOCUMENTS

| | | | | |
|---|---|---|---|---|
| 2,435,021 A | * | 1/1948 | Seider | 180/212 |
| 4,556,119 A | * | 12/1985 | Shiratsuchi | 180/219 |
| 4,887,687 A | * | 12/1989 | Asai et al. | 180/219 |
| 5,361,864 A | * | 11/1994 | Tanaka | 180/219 |
| 5,531,289 A | * | 7/1996 | Muramatsu | 180/227 |
| 5,785,141 A | * | 7/1998 | Breitkreutz et al. | 180/219 |
| 6,189,638 B1 | * | 2/2001 | Ito et al. | 180/227 |
| 6,315,071 B1 | * | 11/2001 | Gogo | 180/219 |
| 6,450,282 B1 | * | 9/2002 | Gogo et al. | 180/219 |
| 6,481,523 B1 | * | 11/2002 | Noro et al. | 180/227 |
| 6,846,018 B2 | * | 1/2005 | Dennert et al. | 280/785 |
| 6,913,101 B2 | * | 7/2005 | Uneta et al. | 180/227 |
| 7,163,365 B2 | * | 1/2007 | Manaka et al. | 411/374 |
| 2004/0130123 A1 | * | 7/2004 | Uneta et al. | 280/284 |
| 2005/0150703 A1 | * | 7/2005 | Nakagome et al. | 180/219 |
| 2006/0076175 A1 | * | 4/2006 | Yamakura et al. | 180/219 |

FOREIGN PATENT DOCUMENTS

JP 2004-122864 A 4/2004

* cited by examiner

*Primary Examiner*—Lesley Morris
*Assistant Examiner*—Maurice Williams
(74) *Attorney, Agent, or Firm*—Birch, Stewart, Kolasch & Birch, LLP (57) ABSTRACT

To provide a rear swing arm installation structure that does not require large tightening force and upsizing and can avoid backlash of a rear swing arm. In a rear swing arm installation structure, a cylindrical spacer into which a pivot shaft is inserted is screwed into the pivot bearing holes of a pair of vehicle body frames. The spacer includes a head section of a large diameter and a screw section having a smaller diameter than the head section. The head section touches an end face of the pivot bearing hole of the vehicle body frame and the tip of the screw section touches an end face of a rear swing arm.

19 Claims, 6 Drawing Sheets

BACKGROUND ART

REAR SWING ARM INSTALLATION STRUCTURE

CROSS-REFERENCE TO RELATED APPLICATIONS

The present application claims priority under 35 USC 119 to Japanese Patent Application No. 2005-167754 filed on Jun. 8, 2005 the entire contents of which are hereby incorporated by reference.

FIELD OF THE INVENTION

The present invention relates to a rear swing arm installation structure of a motorcycle.

DESCRIPTION OF BACKGROUND ART

Figure 7:
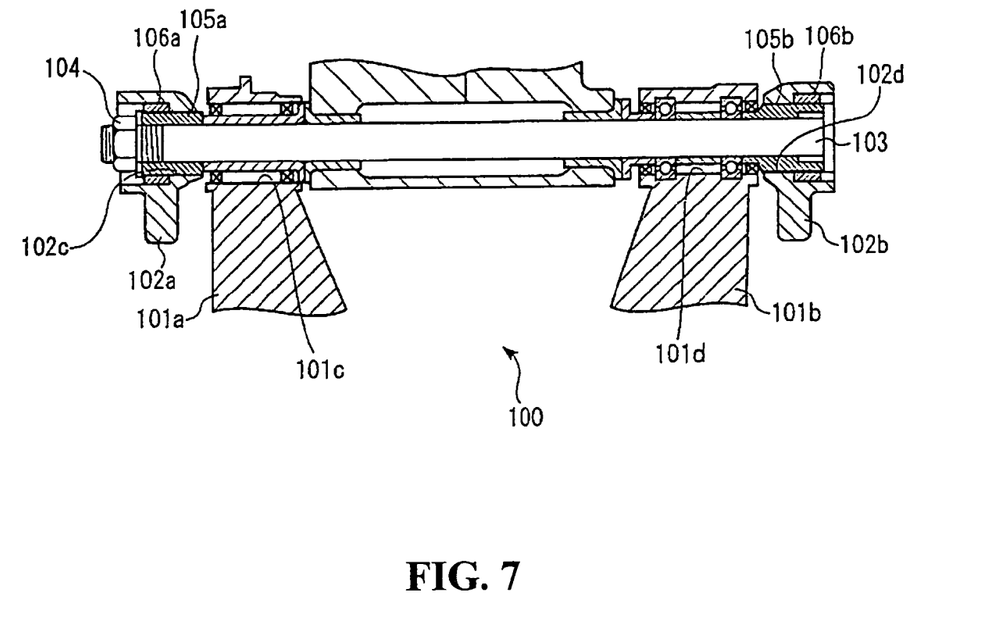
FIG. 7 is a sectional view of a conventional rear swing arm installation structure.

In a conventional rear swing arm installation structure 100, as shown in FIG. 7, pivot bearing holes 102c and 102d are coaxially drilled in a pair of vehicle body frames 102a and 102b. In addition, insertion holes 101c and 101d for a pivot bolt formed at the pivot sections of rear swing arms 101a and 101b are coaxially disposed between the pivot bearing holes 102c and 102d. Thereafter a pivot bolt 103 is inserted into the pivot bearing holes 102c and 102d and the insertion holes 101c and 101d and a nut 104 is screwed onto the pivot bolt 103. As a result, the rear swing arms 101a and 101b are in the state of being supported swingably around the pivot bolt 103 between the pair of the vehicle body frames 102a and 102b. See, for example, JP-A No. 122864/2004.

As illustrated in FIG. 7, the gap between the rear swing arm 101a and the vehicle body frame 102a is adjusted with an adjusting bolt 105a and a lock nut 106a. More specifically, the adjusting bolt 105a is screwed into the pivot bearing hole 102c of the vehicle body frame 102a, and the pivot bolt 103 is inserted into the adjusting bolt 105a. The adjusting bolt 105a moves along the axis line of the pivot bearing hole 102c by forward and backward movement that is driven by screwing the adjusting bolt 105a. Thus, the gap between the rear swing arm 101a and the vehicle body frame 102a is adjusted. The adjusting bolt 105a is fixed with the lock nut 106a in this state.

In addition, the gap between the rear swing arm 101b and the vehicle body frame 102b is adjusted with an adjusting bolt 105b and a lock nut 106b. More specifically, the adjusting bolt 105b is screwed into the pivot bearing hole 102d of the vehicle body frame 102b, and the pivot bolt 103 is inserted into the adjusting bolt 105b. The adjusting bolt 105b moves along the axis line of the pivot bearing hole 102d by forward and backward movement driven by screwing. Thus, the gap between the rear swing arm 101b and the vehicle body frame 102b is adjusted. The adjusting bolt 105b is fixed with the lock nut 106b in this state.

However, in the rear swing arm installation structure 100, the gaps between the rear swing arms 101a and 101b and the vehicle body frames 102a and 102b are adjusted with the adjusting bolts 105a and 105b and the lock nuts 106a and 106b. In the case of a motorcycle with a shaft drive mechanism, the weight of the rear swing arms 101a and 101b is substantial. Thus, problems arise wherein the adjusting bolts 105a and 105b require a large tightening torque. Thereby, an upsizing of the lock nuts 106a and 106b is required which results in an increase in the number of manufacturing processes and an increase in the weight.

SUMMARY AND OBJECTS OF THE INVENTION

The present invention to solve the above technological problems has been established in view of the above situation. It is an object of an embodiment of the present invention to provide a rear swing arm installation structure which does not require a large tightening torque and upsizing.

In order to attain an object according to an embodiment of the present invention, a rear swing arm installation structure is provided wherein pivot bearing holes are coaxially drilled into a pair of vehicle body frames with an insertion hole of a rear swing arm being coaxially disposed between the pivot bearing holes and the rear swing arm being pivotally supported between the pair of the vehicle body frames via a pivot shaft inserted into the pivot bearing holes and the insertion hole. A cylindrical spacer is provided into which the pivot shaft is inserted by screwing into one of the pivot bearing holes. The spacer includes a head section of a large diameter and a screw section having a smaller diameter than the head section. The head section touches the end face, on the outer side of the vehicle body, of the one pivot bearing hole, and the tip of the screw section touches an end face of the rear swing arm.

Further, according to an embodiment of the present invention a recessed section in which the head section of the spacer is contained is formed at the one pivot bearing hole.

Furthermore, according to an embodiment of the present invention an engaging section which can engage with a tool is formed at the head section of the spacer.

In addition, according to an embodiment of the present invention the head section of the spacer is formed so that the diameter thereof is larger than the diameter of the head section of the pivot shaft to the extent that the engaging section is exposed.

According to the embodiments of the present invention, the gaps between a rear swing arm and vehicle body frames are easily adjusted with simple component parts. Thus, a large tightening torque is not required. Therefore, the upsizing of a rear swing arm installation structure can be avoided, and an increase in the number of manufacturing processes and an increase in the weight is not caused.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 6(*a*) and 6(*b*) are views showing the head section of the spacer shown in FIG. 3.

DETAILED DESCRIPTION OF THE PREFERRED EMBODIMENTS

Embodiments according to the present invention are hereunder explained in detail on the basis of the drawings.

Figure 1:
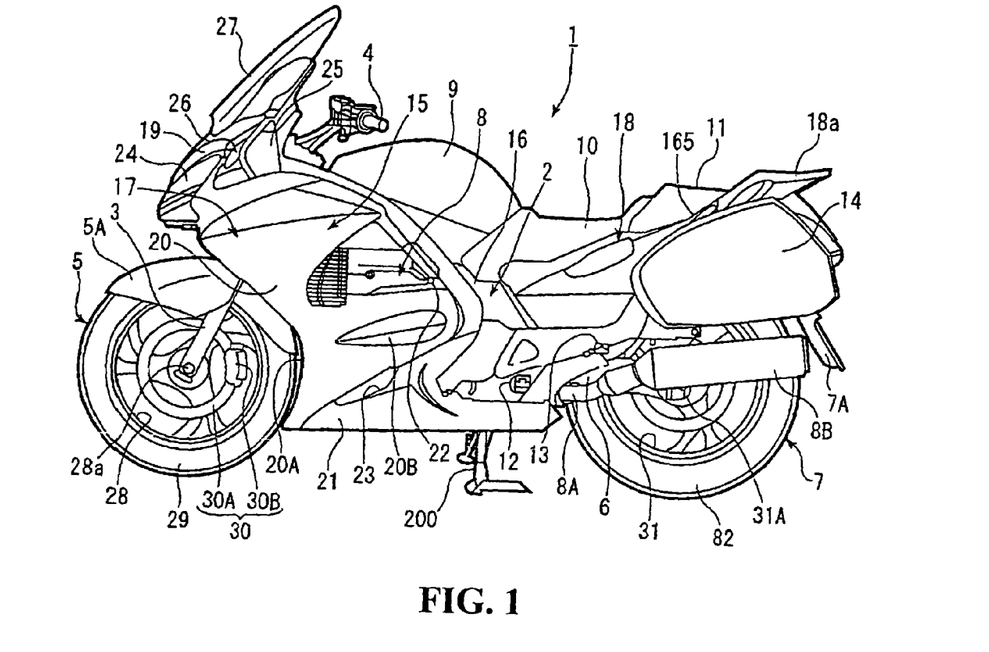
FIG. 1 is a side view of a motorcycle according to an embodiment of the present invention.

FIG. 1 is a view showing an example of a motorcycle 1 equipped with a rear swing arm installation structure of an embodiment according to the present invention. In FIG. 1, the motorcycle 1 is illustrated in the state of being supported by a stand 200.

As shown in FIG. 1, the motorcycle 1 is equipped with a vehicle body frame 2 with a pair of right and left front forks 3 rotatably supported by the front end of the vehicle body frame 2. A handlebar 4 is provided for steering and is attached to the top end of the front forks 3 with a front wheel 5 rotatably supported by the front forks 3. A rear swing arm 6 is swingably supported by the vehicle body frame 2 with a rear wheel 7 rotatably supported by the rear end of the rear swing arm 6. An engine 8 is supported by the vehicle body frame 2 with a fuel tank 9 placed above the vehicle body frame 2. A rider's seat 10 is disposed on the rear side of the fuel tank 9 with a pillion 11 on which a passenger sits being disposed on the rear side of the rider's seat 10. A rider's steps 12 is provided together with a passenger's steps 13. Side trunks 14 are attached to the rear parts of the vehicle body on the right and left sides thereof. A cowling 15 covers almost all of the vehicle body.

Exhaust pipes 8A are connected to the cylinder section of the engine 8 with each of the exhaust pipes 8A extending downwardly and then bending below the engine 8 and thereafter being connected to a muffler 8B disposed on the rear side thereof.

The cowling 15 comprises a front cowl 17 covering the front part of the vehicle body and a rear cowl 18 covering the rear part of the vehicle body located below the seats 10 and 11. In addition, the front cowl 17 comprises an upper cowl 19 disposed at the front end of the vehicle body, middle cowls 20 covering the side parts of the engine 8, and an under cowl 21 covering the lower part of the engine 8, the lower parts of the exhaust pipes 8A.

First openings 22 are formed at the center section, in the vertical direction, of the front cowl 17 and second openings 23 are formed at the lower section thereof. The airflow (traveling upwind) passes between the interior and exterior of the cowling through the first openings 22 and the second openings 23. A head cover of the engine 8 is exposed from the first openings 22. Further, at the front parts of the middle cowls 20 of the front cowl 17, traveling upwind inlets 20A for introducing the airflow into the interior of the cowling are formed. In addition, on the right and left sides of the lower parts of the middle cowls 20, bulging panels 20B bulging to the outer sides of the vehicle body are disposed.

A meter unit (not shown in the figure) to which a speedometer, an engine tachometer and other equipment are attached is disposed inside the upper cowl 19. Further, a headlight 24 is disposed on the front face of the upper cowl 19 and rearview mirror covers 25 are disposed on both sides of the upper cowl 19 in the manner of bulging. Rearview mirrors (not shown in the figure) are disposed in the interiors of the rearview mirror covers 25. Furthermore, a direction indicator 26 is disposed on the front face of each of the rearview mirror covers 25. A windscreen 27, made of transparent synthetic resin, for providing a front view is disposed at the upper part of the upper cowl 19.

The rear cowl 18 is formed from the lower side of the seats 10 and 11 to the rear side thereof and, at the rear part thereof, integrally has a tail section 18*a* covering the rear part of the seat 11. A rear fender 7A covering the upper rear part of the rear wheel 7 is attached to the rear end of the rear cowl 18.

The front wheel 5 is formed by mounting a tire 29 around the outer circumference of a wheel 28 having an axle 28*a* in the center thereof and both the right and left sides of the axle 28*a* are supported by the bottom ends of the front forks 3. Thereafter, a front fender 5A for covering the upper part of the front wheel 5 is attached to the right and left front forks 3. On both right and left sides of the wheel 28 of the front wheel 5, rotors 30A including a front disc brake unit 30 are fixed to the wheel 28 coaxially and integrally. The front disc brake unit 30 has the rotors 30A and brake calipers 30B that interpose the rotors 30A and dampen the rotation thereof by a frictional force in an operating state.

Figure 3:
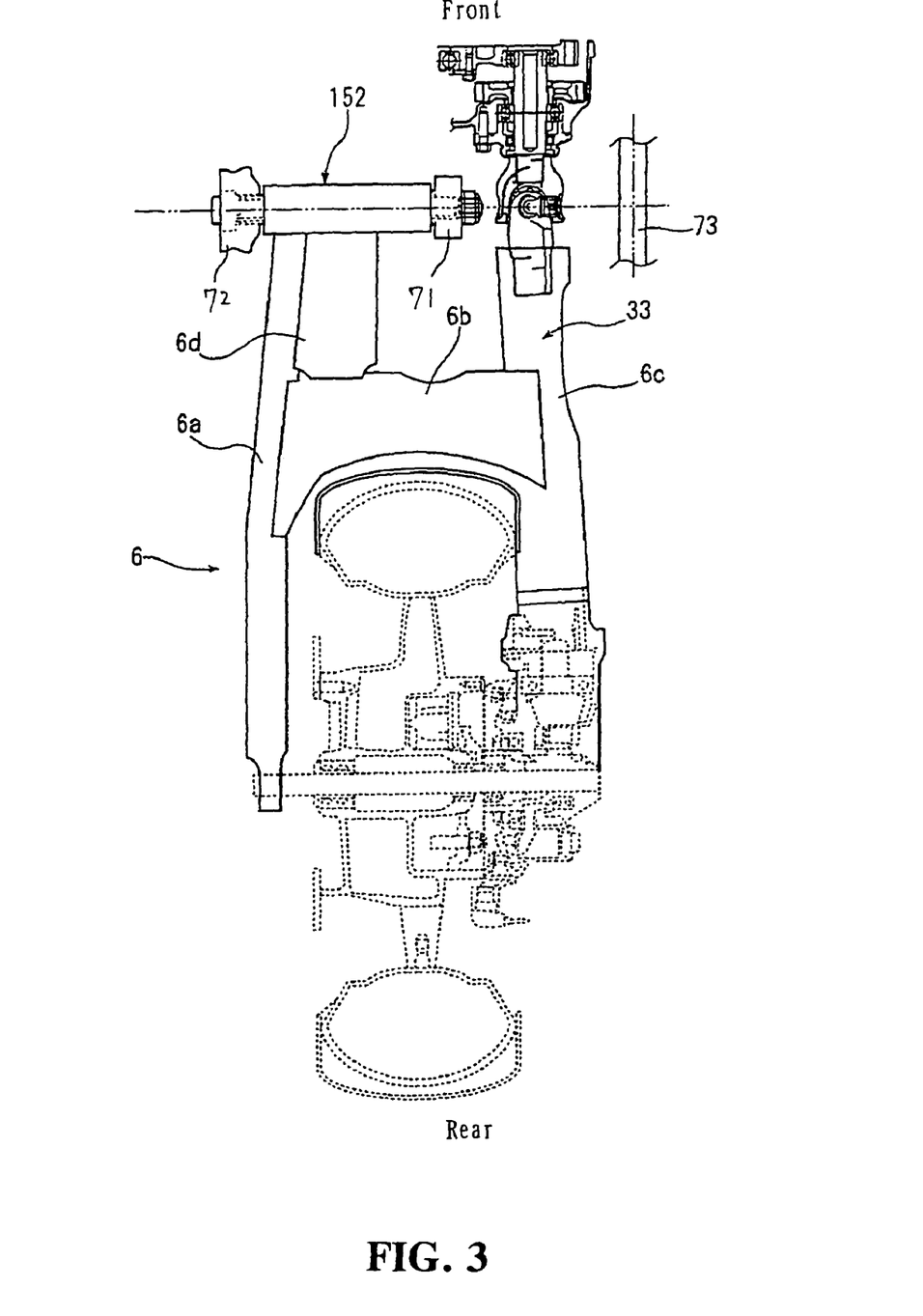
FIG. 3 is a view illustrating the rear swing arm shown in FIG. 1.

The rear swing arm 6 rotatably supports the rear wheel 7 at the rear end thereof. A shaft drive mechanism 33 shown in FIG. 3 is connected to an axle 31A of the rear wheel 7 and the rear wheel 7 is driven by the shaft drive mechanism 33.

The rear wheel 7, like the front wheel 5, has a wheel 31 having the axle 31A in the center thereof and a tire 32 mounted around the outer circumference of the wheel 31. The rear wheel 7 also has a rear disc brake unit including rotors and brake calipers in the same way as the front disc brake unit 30 of the front wheel 5 but the explanation thereof is omitted here.

Figure 2:
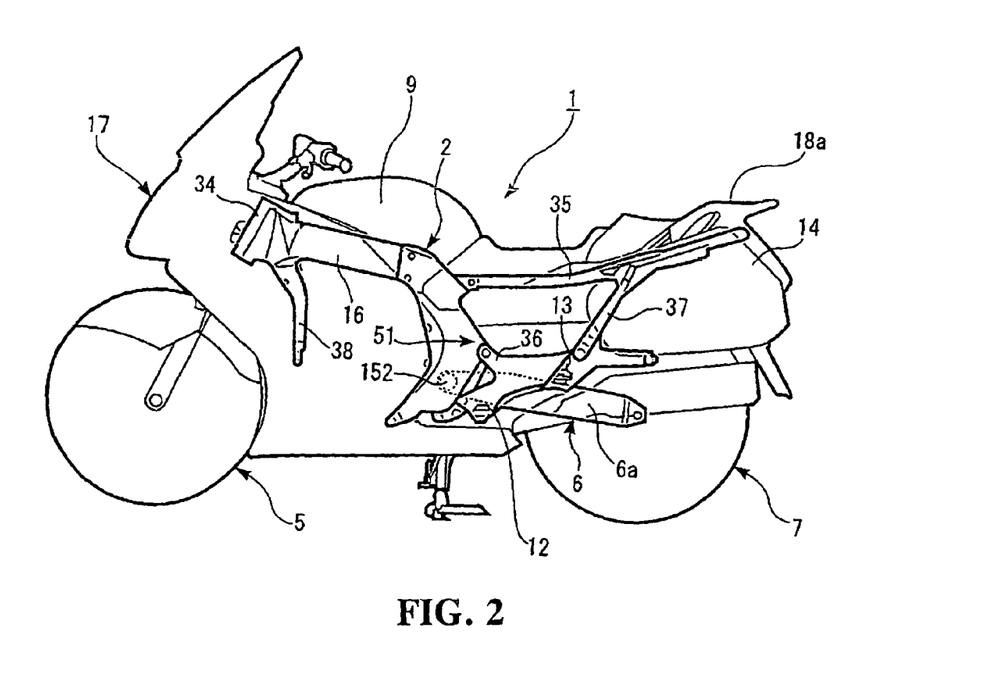
FIG. 2 illustrated a view of the vehicle body frame of a motorcycle according to an embodiment of the present invention.

As shown in FIG. 2, the vehicle body frame 2 has a head pipe 34 disposed at the front end thereof with a pair of right and left main frames 16 extending from the head pipe 34 obliquely downwardly in the rear direction. Seat frames 35 extend from the upper parts of the main frames 16 in the rear direction of the vehicle body with step plates 36 extending from the lower parts of the main frames 16 in the rear direction of the vehicle body. Rear frames 37 are provided for connecting the seat frames 35 to the step plates 36 on the rear side of the vehicle body.

The head pipe 34 steerably supports the front forks 3 which support the front wheel 5. Further, a stay extending frontward is attached to the head pipe 34. The stay supports a meter unit including a speedometer, an engine tachometer and other equipment. In addition, a bracket (not shown in the figure) is connected to the stay attached to the head pipe 34 and the bracket supports the front cowl 17.

The main frames 16 are composed of hollow members which are made of metal such as aluminum or the like and have a square-shaped cross section. The main frames 16 support the fuel tank 9 at the upper parts thereof. Further, an engine hanger 38 is formed in the manner of extending downwardly from between the head pipe 34 and the main frames 16 of the vehicle body frame 2 and the main frames 16 support the engine 8 via the engine hanger 38.

The seat frames 35 are disposed right and left in a pair and extend rearwardly from the upper parts of the pair of right and left main frames 16, respectively. The pair of right and left seat frames 35 support the driver's seat 10 and the passenger's seat 11, extend up to the vicinity of the tail section 18*a*, and are connected on the rear end side. The seat frames 35, like the main frames 16, are also composed of hollow members which are made of metal such as aluminum or the like and have a square-shaped cross section.

The step plates 36 are disposed right and left in a pair and extend rearwardly from the lower parts of the pair of right and left main frames 16, respectively. Steps 12 for a driver are disposed on the outer sides of the front parts of the step plates 36 and steps 13 for a passenger are disposed at the lower parts of the rear frames 37. More specifically, the step plates 36 and the rear frames 37 as rigid members function as step holders. The step plates 36, like the main frames 16, are also composed of hollow members that are made of metal such as aluminum or the like and have a square-shaped cross section.

The rear swing arm 6 swingably supports the rear wheel 7 and is connected to the front parts of the step plates 36. The rear swing arm 6 is attached to a rear arm bracket 51 as a constituent member of the vehicle body frame 2 via a pivot section 152 at the front end thereof. A pair of the right and left arm sections 6a extend rearwardly from the pivot section 152. The pivot section 152 is rotatably supported by the rear arm bracket 51 and thereby the arm sections 6a can vertically be swung around the pivot section 152.

The rear frames 37 are disposed right and left in a pair with the top ends thereof being connected nearly to the center portions of the seat frames 35 in the anteroposterior direction of the vehicle body and the bottom ends thereof being connected to the rear sections of the step plates 36. The rear frames 37 are also composed of hollow members which are made of metal such as aluminum or the like and have a square-shaped cross section.

The vehicle body frame 2 is configured so that the space formed by the rear arm bracket 51 connected to the main frames 16, the seat frames 35, the step plates 36, and the rear frames 37 may have a square shape on a side view. More specifically, the space has the shape of an isosceles trapezoid wherein the lower side thereof (the side of the step plates 36) is shorter than the upper side thereof (the side of the seat frames 35) in a side view. Each of the main frames 16, the rear arm bracket 51, the seat frames 35, the step plates 36, and the rear frames 37 are connected to each other and function as a strengthening member to maintain the strength of the whole vehicle body.

As stated above, the vehicle body frame 2 includes the main frames 16, the rear arm bracket 51 connected to the main frames 16, the seat frames 35 and the step plates 36 extending rearwardly from the upper parts and the lower parts of the main frames 16, respectively. The rear frames 37 connecting the seat frames 35 to the step plates 36 and the space is formed by the above frames so as to have a nearly square shape in a side view. Thus, it is possible to obtain high rigidity without requiring other reinforcing members. Further, since other reinforcing members are not required and the number of all the members is reduced, it is possible to realize a cost reduction and to effectively utilize the space surrounded by the frames.

Figure 4:
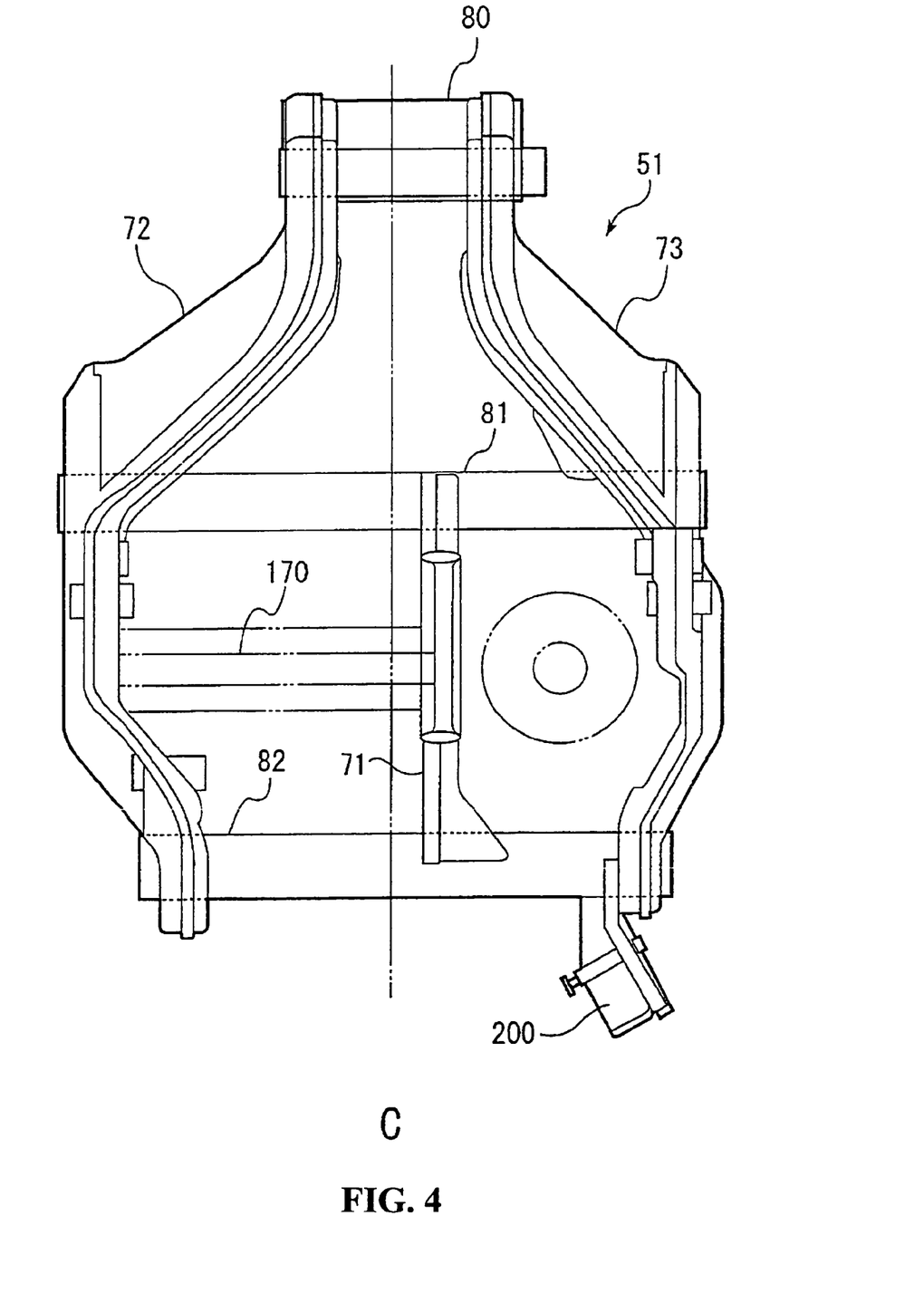
FIG. 4 is a view illustrating the rear arm bracket shown in FIG. 1.

Next, a basic configuration of a rear arm bracket 51 which is a constituent element of a vehicle body frame and to which a pivot section 152 of a rear swing arm 6 is attached is explained on the basis of FIGS. 3 and 4.

As shown in FIG. 3, a rear swing arm 6 includes a pivot section 152 disposed at the front end thereof at the opening on the left side with an arm section 6a extending rearwardly with a cross part 6b and a shaft housing 6c being provided which have a shape of a hollow round cross section. The pivot section 152 is connected to the cross part 6b. A shaft drive mechanism 33 is disposed to be nearly parallel with the arm section 6a. An extended section 6d connects the pivot section 152 to the cross part 6b and thus functions as a strengthening member.

FIG. 4 is a back view explaining a rear arm bracket 51. The rear arm bracket 51 is formed by connecting right and left frame members 73 and 72 to each other with an upper cross pipe 80, a middle cross pipe 81, and a lower cross pipe 82. The pipes are formed by, for example, hollow pipe materials and are disposed relative to a center pivot plate 71 (the vehicle body frame) in the vertical direction for connecting both the pipes 81 and 82 nearly at the middle portions of the middle cross pipe 81 and the lower cross pipe 82 in the vehicle width direction. A pivot section of a rear swing arm 6 is placed between the center pivot plate 71 and the frame member 72 (the vehicle body frame) on the left side thereof. A pivot shaft 170 is provided for suspending the rear swing arm 6. A stand support member 200 is attached to the frame member 73 and the lower cross pipe 82. A center line C of a motorcycle in the vertical direction thereof is provided.

The rear arm bracket 51 includes the frame members 72 and 73, the upper cross pipe 80, the middle cross pipe 81, the lower cross pipe 82, and the center pivot plate 71 including a rear swing arm support member to support the rear swing arm 6 swingably in the vertical direction and for also playing the role of a member forming a part of the vehicle body frame.

Figure 5:
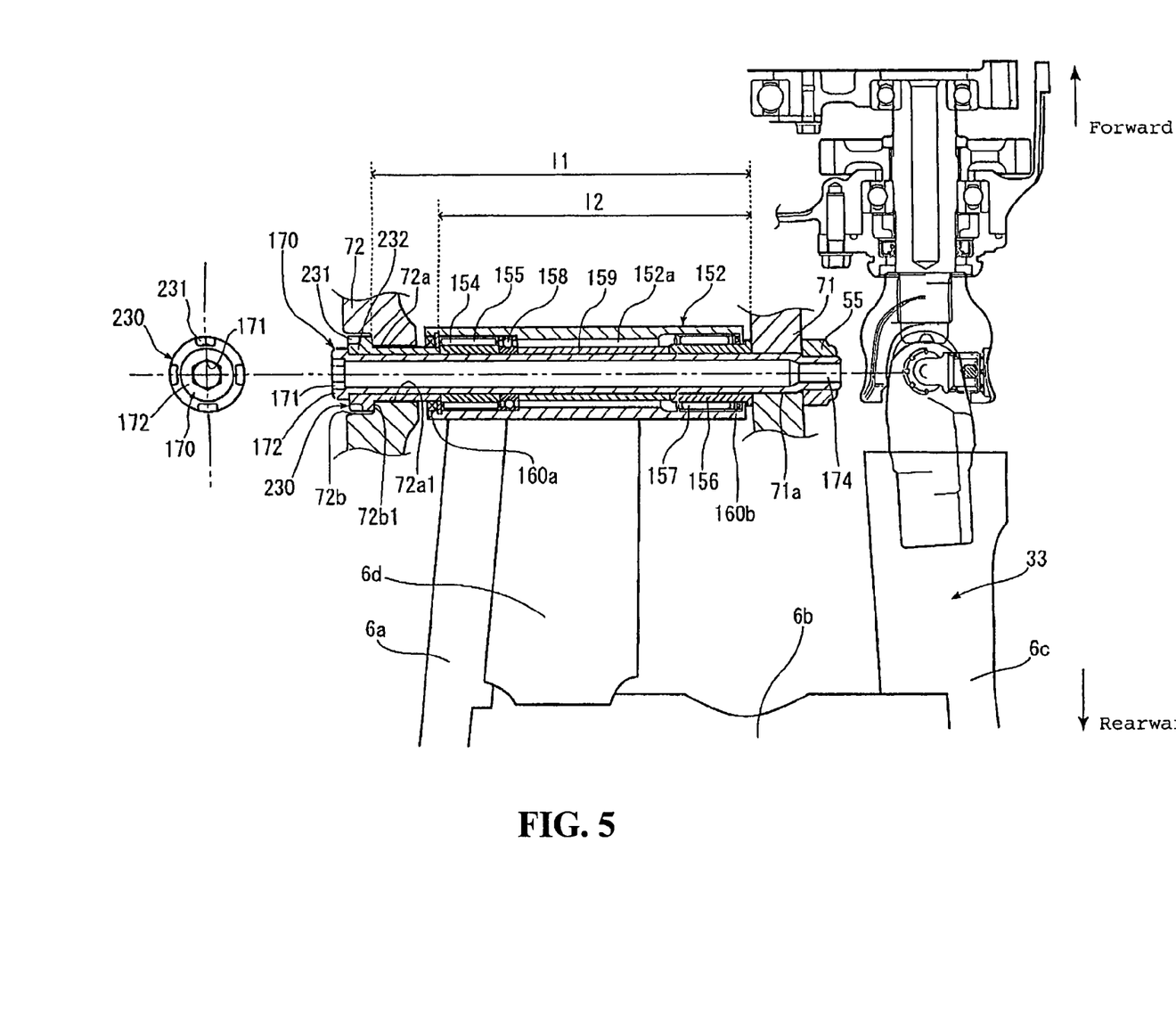
FIG. 5 is a sectional view of the rear swing arm installation structure shown in FIG. 2.

Reviewing FIG. 5, a structure of the rear swing arm 6 is explained which is a constituent element essential to the present invention that is installed onto the rear arm bracket 51. A first pivot bearing hole 71a and a second pivot bearing hole 72a are coaxially formed in the center pivot plate 71 with the frame member 72 of the rear arm bracket 51 forming the vehicle body frame 2. An insertion hole 152a is formed in a pivot section 152 of the rear swing arm 6 and is coaxially disposed between both the pivot bearing holes 71a and 72a. A pivot shaft 170, which will be described later, is inserted into the insertion hole 152a.

Further, in the interior of the insertion hole 152a of the pivot section 152, in the order from the side of the frame member 72, a first collar 154 on the inner circumference is coaxially disposed together with a needle bearing 155 placed on the outer circumference thereof, a ball bearing 158, a distance collar 159 to maintain a center distance, another needle bearing 157, and a second collar 156 placed on the inner circumference thereof. Furthermore, dust seals 160a and 160b for dust prevention are mounted in the vicinities of both open ends in the insertion hole 152a.

Figure 6A:
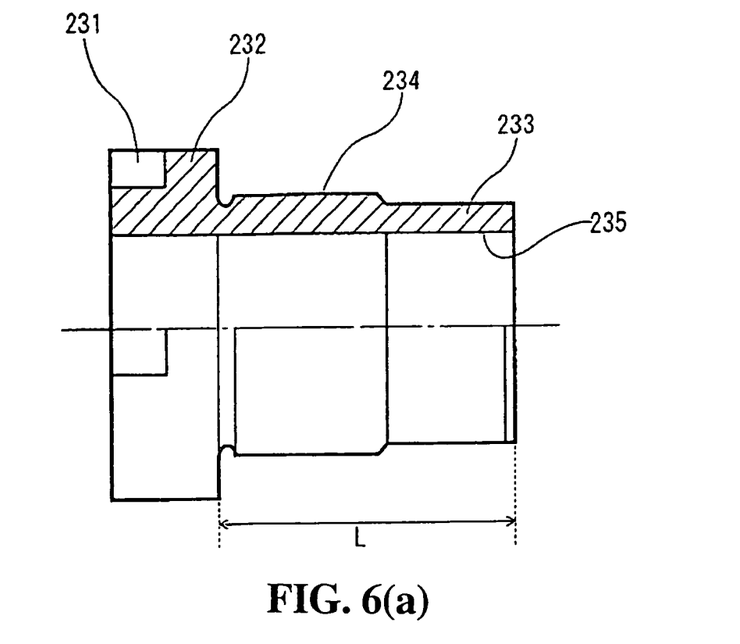
Figure 6B:
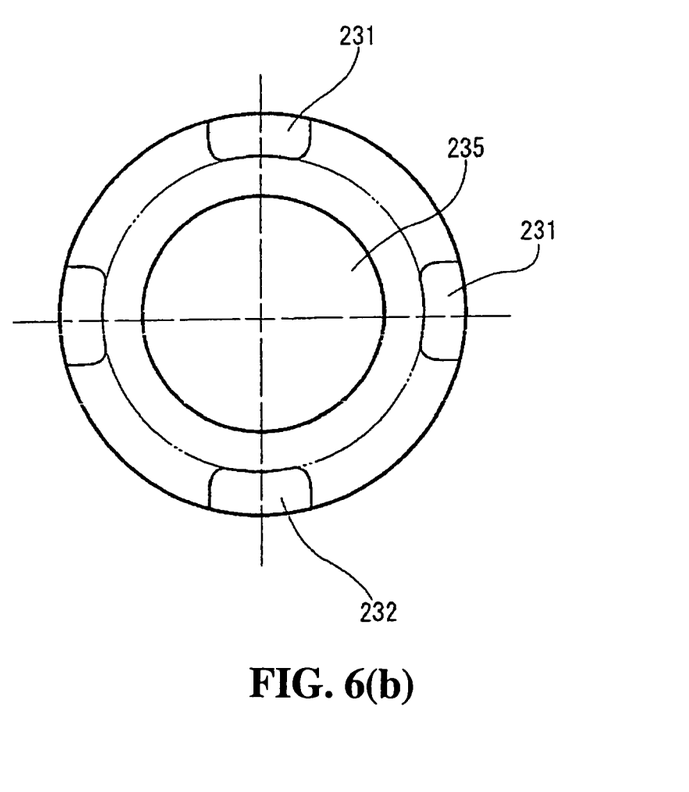

In addition, a female screw section 72a1 is formed in the pivot bearing hole 72a of the frame member 72 and a cylindrical spacer 230 having the structure shown in FIGS. 6(a) and 6(b) is screwed into the female screw section 72a1. The spacer 230 includes an insertion hole 235 into which the pivot shaft 170 is fit, a round head section 232 touching an end face of the pivot bearing hole 72a and a male screw section 234 formed along roughly half of the length from the head section 232 around the outer circumference of a shaft section 233 having a smaller diameter than the head section 232. Further, the shaft section 233 of the spacer 230 is designed so that the end face thereof on the side of the vehicle body interior may project from the pivot bearing hole 72a toward the vehicle body interior and may touch the outer end face of the first collar 154 when the male screw section 234 is screwed into the female screw section 72a1.

The spacer 230 configured as stated above moves in the direction of the axis line of the pivot bearing hole 72a and is attachable to and detachable from the first collar 154 by the forward and backward movement driven by screwing the male screw section 234 into the female screw section 72a1.

More specifically, the spacer 230 is designed so that the gap between the pivot section 152 and the frame member 72 may be adjusted by the screw adjustment of the spacer 230.

Further, recessed engaging sections 231 for engaging with a tool are formed at outer circumference parts of the head section 232 of the spacer 230 at intervals of, for example, 90 degrees. It goes without saying that the number of the engaging sections 231 is not limited to the example and an arbitrary number may be adopted. Furthermore, it is also possible to adopt a projecting shape projecting outwardly instead of a recessed shape as long as the engaging sections 231 can engage with a tool. In addition, the head section 232 is formed so as to have a larger diameter than the head section of the pivot bolt 170 which will be described later so that the engaging sections 231 can engage with a tool with no difficulty and may always be exposed.

In addition, a recessed section 72b to contain the head section 232 of the spacer 230 is recessed at the end face (outer face) of the pivot bearing hole 72a of the frame member 72. The bottom section 72b1 of the recessed section 72b functions as a seat face for touching the head section 232. Thus, the spacer 230 is fit into the pivot bearing hole 72a by engaging a tool with the engaging sections 231 and being screwed into the pivot bearing hole 72a until the head section 232 thereof touches the bottom section 72b1. At this time, the tip (inner end) of the shaft section 233 touches the end face of the first collar 154. In this way, the gap between the rear swing arm 6 and the frame member 72 can be adjusted by screwing the spacer 230 into the pivot bearing hole 72a and putting the end face of the shaft section 233 on the inner side of the vehicle body in touch with the first collar 154. Here in this case, a plurality of spacers having various axial lengths are prepared beforehand. For example, a spacer 230 having the length L, of the shaft section 233, which is closest to the difference between a length 11 and a length 12 (the difference between the distance between the center pivot plate 71 and the bottom section 72b1 of the recessed section 72b and the distance between the center pivot plate 71 and the first collar 154) is selected from among the plurality of spacers. The selected spacer is used by being screwed into the pivot bearing hole 72a. By so doing, it is possible to substantially fill up the gap existing between the pivot section 152 and the frame member 72.

The pivot shaft 170 is a hollow-shaped shaft member having a cross section of a round outer circumference and has a head section 172 for engaging which a hexagon socket 171. For example, a torque wrench (not shown in the figure) is formed at one end thereof and a screw section 174, onto which a fixing nut 55 is screwed, is formed at the other end thereof. The head section 172 touches the head section 232 of the spacer 230. The pivot shaft 170 is formed into a hollow shape with the intent of weight reduction in the present embodiment. However, it goes without saying that the pivot shaft 170 may be a solid bolt.

Next, the procedures for assembling the rear swing arm 6 to the center pivot plate 71 and the frame member 72 (hereunder referred to as "a pair of frame members 71 and 72") are explained. In FIG. 6, first, the rear swing arm 6 is disposed between the pair of frame members 71 and 72 and the spacer 230 is temporarily screwed into the pivot bearing hole 72a of the frame member 72. The pivot shaft 170 is inserted into the insertion hole 235 (refer to FIG. 6) of the spacer 230 from the left side and then sequentially into the first collar 154, the ball bearing 158, the distance collar 159, the second collar 156, and the pivot bearing hole 71a of the center pivot plate 71. These members are temporarily assembled by screwing the fixing nut 55 onto the screw section 174 of the pivot shaft 170 projecting outside the center pivot plate 71. In this state, a tool is engaged with the engaging sections 231 of the spacer 230 and screwing is carried out until the head section 232 of the spacer 230 is seated in the recessed section 72b formed at the end of the pivot bearing hole 72a of the frame member 72. At this time, the spacer 230 advances along the outer circumference of the pivot shaft 170 in the axial direction and the end face of the shaft section 233 of the spacer 230 begins to touch the first collar 154. Further, when the spacer 230 is continuously screwed in with the tool, the right end face of the second collar 156 finally touches the inner face of the center pivot plate 71. Nearly at the same time as above, the neck section of the head section 232 of the spacer 230 is seated on the bottom section 72b1 of the recessed section 72b of the frame member 72 and the make up of the spacer 230 is completed. In this example, the make up of the pivot shaft 170 is completed by applying a tool not shown in the figure to the hexagon socket 171 of the pivot shaft 170 and, on the other hand, screwing and tightening the nut 55 onto the screw section 174. By so doing, the rear swing arm 6 is supported swingably in the vertical direction of a motorcycle between the pair of frame members 71 and 72 in the state of not forming a gap.

As explained above, in the present embodiment, a spacer 230 having an axis length L (refer to FIG. 6) commensurate with the length filling up the gap existing between the end face of the pivot section 152 and the frame member 72 is selected and the selected spacer 230 is screwed into the pivot bearing hole 72a until the head section 232 thereof is seated on the bottom section 72b1 of the recessed section 72b formed at the end face of the pivot bearing hole 72a. The pivot section 152 is retained between the pair of frame members 71 and 72 right near the state of having neither backlash nor allowance while the head section 232 is seated on the bottom section 72b1. In this state, by screwing and tightening the fixing nut 55 onto the pivot shaft 170, the force of fastening the pivot shaft 170 to the frame members 71 and 72 in the direction of the pivot axis is applied to the head section 232 of the spacer 230 via the head section 172 of the pivot shaft 170. As a result, the state wherein the spacer 230, the frame member 72, the first collar 154, the distance collar 159, the second collar 156, and the center pivot plate 71 are interposed between the head section 172 of the pivot shaft 170 and the fixing nut 55 is obtained and the rear swing arm 6 is swingably supported in the state of no gap.

Further, since the spacer 230 is formed by integrating both the functions of a locknut and an adjusting bolt, it is possible to avoid a large tightening force, improve working efficiency, further reduce the number of parts and prevent the weight of a vehicle from increasing.

In addition, since the head section 232 of the spacer 230 is formed so as to have a larger diameter than the head section of the pivot shaft 170 the engaging sections 231 formed thereon may not be hidden by the head section 172 of the pivot shaft 170. Thus, it is possible to adjust a gap in a simple manner even after the pivot shaft 170 is inserted into the spacer 230 and improve maintainability.

Further, since the head section 232 of the spacer 230 is contained in the recessed section 72b formed at the end of the pivot bearing hole 72a of the frame member 72, it is possible to shorten the length of project toward the outside of the frame member 72 and consequently improve the features and appearance.

In addition, since the pivot shaft 170 is formed into a hollow shape, it is advantageous for a reduction in the weight of a vehicle unlike the case of using an ordinary solid bolt.

As stated above, an embodiment according to the present invention has been explained in detail in reference to drawings. However, a concrete construction is not limited to this embodiment and even if modifications in design and others are carried out in the range not deviating from the tenor of the present invention, the modifications are included in the scope of the present invention.

For example, though the engaging sections 231 of the head section 232 of the spacer 230 are formed in the vicinity of the outer periphery in the above embodiment, the engaging sections 231 may be formed at inner positions of the head section 232 as long as the fastening torque of a spacer can be applied.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A rear swing arm installation structure for a vehicle body in which pivot bearing holes are coaxially drilled into a pair of vehicle frame member, an insertion hole of a rear swing arm is coaxially disposed between the pivot bearing holes, and the rear swing arm is pivotally supported between the pair of vehicle frame members via a pivot shaft inserted into the pivot bearing holes and the insertion hole, comprising:
   a cylindrical spacer into which the pivot shaft is inserted, said cylindrical spacer being screwed into one of the pivot bearing holes;
   the cylindrical spacer including a head section, a screw section, and a shaft section with an inner end,
   said screw section having a smaller diameter than the head section and a larger diameter than the shaft section;
   wherein the head section touches an end face of at least one of the pivot bearing holes on the outer side of one of the vehicle frame members; and the inner end of the shaft section directly touches an end face of a first collar member, and
   wherein the cylindrical spacer is a locknut and an adjustment bolt formed as a single piece for avoiding large tightening forces.

2. The rear swing arm installation structure according to claim 1, wherein a recessed section in which the head section of the cylindrical spacer is contained is formed in the at least one pivot bearing hole.

3. The rear swing arm installation structure according to claim 1, wherein recessed engaging sections which can engage with a tool are formed at equal intervals on the head section of the cylindrical spacer.

4. The rear swing arm installation structure according to claim 1, wherein at least a portion of the shaft section of the cylindrical spacer is surrounded by a dust seal of the swing arm.

5. The rear swing arm installation structure according to claim 3, wherein the head section of the cylindrical spacer is formed so that the diameter thereof is larger than the diameter of the head section of the pivot shaft to the extent that the engaging sections are exposed.

6. The rear swing arm installation structure according to claim 4, wherein recessed engaging sections which can engage with a tool are formed at equal intervals on the head section of the cylindrical spacer, and
   the head section of the cylindrical spacer is formed so that the diameter thereof is larger than the diameter of the head section of the pivot shaft to the extent that the engaging sections are exposed.

7. The rear swing arm installation structure according to claim 1, wherein the shaft section of the cylindrical spacer extends a predetermined distance from the screw section, and the end face of the swing arm is rotatably supported on the inner end of the shaft section.

8. The rear swing arm installation structure according to claim 1, wherein said at least one pivot bearing hole includes a bottom section and wherein said cylindrical spacer is screwed into said at least one pivot bearing hole until the head section engages the bottom section.

9. The rear swing arm installation structure according to claim 1, wherein the first collar is disposed relative to the rear swing arm, wherein said cylindrical spacer is screwed into said at least one pivot bearing hole until the inner end of the shaft section touches the first collar to enable an adjustment of a gap between the rear swing arm and the pair of vehicle frame members.

10. A cylindrical spacer for use with a rear swing arm installation structure for a vehicle body in which pivot bearing holes are coaxially drilled into a pair of vehicle body frames with an insertion hole of a rear swing arm being coaxially disposed between the pivot bearing holes, and the rear swing arm being pivotally supported between the pair of vehicle body frames via a pivot shaft inserted into the pivot bearing holes and the insertion hole wherein said cylindrical spacer is adapted to be screwed into one of the pivot bearing holes, the cylindrical spacer comprising:
   a head section, a screw section, and a shaft section with an inner end,
   said screw section having a smaller diameter than the head section and a larger diameter than the shaft section;
   wherein the head section includes an inner portion for engaging an end face of at least one of the pivot bearing holes on the outer side of the vehicle body; and the inner end of the shaft section is adapted for supporting said rear swing arm,
   wherein in order to adjust a gap between the rear swing arm and the pair of vehicle body frames, the cylindrical spacer is screwed into said at least one pivot bearing hole until the inner end of the shaft section touches a first collar disposed relative to the rear swing arm.

11. The cylindrical spacer for use with rear swing arm installation structure according to claim 10, wherein a recessed section in which the head section of the cylindrical spacer is contained is formed in the at least one pivot bearing hole.

12. The cylindrical spacer for use with rear swing arm installation structure according to claim 10, wherein recessed engaging sections which can engage with a tool are formed at equal intervals on the head section of the spacer.

13. The cylindrical spacer for use with rear swing arm installation structure according to claim 10, wherein at least a portion of the shaft section of the cylindrical spacer is surrounded by a dust seal of the swing arm.

14. The cylindrical spacer for use with rear swing arm installation structure according to claim 12, wherein the head section of the cylindrical spacer is formed so that the diameter thereof is larger than the diameter of the head section of the pivot shaft to the extent that the engaging sections are exposed.

15. The cylindrical spacer for use with rear swing arm installation structure according to claim 13, wherein recessed engaging sections which can engage with a tool is formed at equal intervals on the head section of the cylindrical spacer, and
   the head section of the cylindrical spacer is formed so that the diameter thereof is larger than the diameter of the head section of the pivot shaft to the extent that the engaging sections are exposed.

16. The cylindrical spacer for use with rear swing arm installation structure according to claim 10, wherein the shaft section of the cylindrical spacer extends a predetermined distance from the screw section, and the end face of the swing arm is rotatably supported on the inner end of the shaft section.

17. The cylindrical spacer for use with rear swing arm installation structure according to claim 10, wherein said at least one pivot bearing hole includes a bottom section and wherein said cylindrical spacer is screwed into said at least one pivot bearing hole until the head section engages the bottom section.

18. The cylindrical spacer for use with rear swing arm installation structure according to claim 10,
wherein the pivot shaft includes a head section with an inner side which presses against at least a portion of an end face of the head section of the cylindrical spacer.

19. The cylindrical spacer for use with rear swing arm installation structure according to claim 10, wherein the cylindrical spacer is a locknut and an adjustment bolt formed as a single piece for avoiding large tightening forces.

* * * * *